(12) United States Patent
Tanaka

(10) Patent No.: US 7,287,433 B2
(45) Date of Patent: Oct. 30, 2007

(54) PRESSURE SENSOR

(75) Inventor: Hiroaki Tanaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/444,302

(22) Filed: Jun. 1, 2006

(65) Prior Publication Data
US 2006/0288793 A1 Dec. 28, 2006

(30) Foreign Application Priority Data
Jun. 27, 2005 (JP) .................. 2005-186271

(51) Int. Cl.
*G01L 9/06* (2006.01)
(52) U.S. Cl. .......................... 73/727; 73/754
(58) Field of Classification Search .......... 73/754, 73/721, 727
See application file for complete search history.

(56) References Cited
U.S. PATENT DOCUMENTS
6,085,596 A * 7/2000 Jensen et al. .................. 73/754
6,218,717 B1 * 4/2001 Toyoda et al. ............... 257/419
6,651,508 B2 11/2003 Baba et al.
6,755,084 B2 * 6/2004 Tsukada et al. ............... 73/724
6,933,582 B2 * 8/2005 Ishio et al. .................. 257/419
7,197,939 B2 * 4/2007 Sakai et al. ................... 73/754
2005/0000292 A1 1/2005 Muchow et al.

FOREIGN PATENT DOCUMENTS
JP     A-H4-370726     12/1992
JP     A-H5-133827     5/1993
JP     A-H11-201845     7/1999

\* cited by examiner

*Primary Examiner*—Andre J. Allen
(74) *Attorney, Agent, or Firm*—Posz Law Group, PLC

(57) ABSTRACT

A pressure sensor for detecting a pressure and for outputting a signal based on the piezoresistance effect includes a substrate having a sensor chip on one side in a thin portion and a concave portion on another side, a piezo-resistor in the sensor chip, a pedestal being attached to the substrate and having a through hole for introducing the pressure to the sensor chip and a gel material filled in the concave portion and the through hole for protecting the sensor chip. A ratio of a diameter of the through hole to a thickness of the pedestal is substantially within a range between 1 and 3.

10 Claims, 3 Drawing Sheets

PRESSURE OF MEASURING OBJECT

PRESSURE SENSOR

CROSS REFERENCE TO RELATED APPLICATION

This application is based on and claims the benefit of priority of Japanese Patent Application No. 2005-186271 filed on Jun. 27, 2005, the disclosure of which are incorporated herein by reference.

FIELD OF THE INVENTION

The present invention generally relates to a pressure sensor.

BACKGROUND OF THE INVENTION

Conventionally, a pressure sensor for detecting a pressure by using a semiconductor type diaphragm uses a gel material for protecting a pressure introduction portion in a pedestal portion. The pressure sensors disclosed in the following Japanese and U.S. patent documents JP-A-H4-370726, JP-A-H5-133827, JP-A-H11-201845 and U.S. Pat. No. 6,651,508 have a structure that uses the gel material for protection of the pedestal. The pressure sensor in the disclosure includes a semiconductor diaphragm sensor chip having an element of piezoresistance on one side and a concave portion on a reverse side of a sensor area, and a pedestal made of a glass or the like having a through hole that connects the concave portion to an outside of the sensor.

The pedestal is connected to the sensor chip by an anodic bonding, and the concave portion of the sensor chip is filled with a gel material for protecting of a reverse side of the diaphragm sensor chip.

The diaphragm sensor chip detects a pressure introduced from the through hole that has the gel material contained therein. The sensor chip is a so-called "reverse side sealed type diaphragm sensor chip." The sensor chip outputs a signal that is proportional to an applied pressure based on the piezoresistance effect.

Protection of the sensor chip is required because the chip is used to detect a pressure of a liquid or a gas that has a corrosive effect. The gel material is used to protect the sensor chip from corrosion caused by the liquid or the gas.

The gel material is also effective for protecting breakage, distortion or the like of the diaphragm sensor chip caused by an expansion force of a freezing water in the through hole.

The pressure sensor is used to detect an exhaust gas pressure from a diesel engine or the like. More practically, the pressure sensor detects the exhaust gas pressure in or around a DPF (Diesel Particulate Filter) or a EGR (Exhaust Gas Re-circulation) system.

However, the pressure sensor is expected to be working in an exhaust pipe in a vehicle or the like where the temperature of the environment ranges widely from 0 degree to 100 degrees in Celsius. Therefore, the gel material in the through hole hardens at the temperature of, for example, −30 degrees, thereby yielding a distortion force for pressing the reverse side of the diaphragm. As a result, the diaphragm portion of the sensor chip is distorted to generate a false output. That is, the pressure sensor of a conventional type does not have a measure to handle the situation such as an extreme low temperature or the like.

SUMMARY OF THE INVENTION

In view of the above-described and other problems, the present invention provides a pressure sensor that is structurally resistive to environmental change including temperature change.

The pressure sensor of the present invention includes a pedestal that has a through hole for connecting an outside to a reverse side of a sensor portion of the diaphragm. Distortion of the diaphragm caused by a gel material in the through hole is prevented when a diameter of the through hole is large enough. That is, even when the gel material is hardened in an extremely low temperature, the gel material in an sufficiently large through hole is allowed to expand in an opposite direction to the diaphragm. Therefore, distortion of the diaphragm on the reverse side is structurally prevented.

In the pressure sensor according to the disclosure of the present invention, a ratio of the diameter L of the through hole against thickness T of the pedestal is investigated. That is, the ratio L/T experimentally determined has proven to be effective in terms of prevention of distortion of the gel material in the extremely low temperature on the reverse side of the diaphragm.

The ratio L/T is determined as a value substantially between 1 and 3 in the pressure sensor of the present invention because distortion of the gel material in the through hole toward the diaphragm in the extremely low temperature is structurally limited when the through hole has a large diameter relative to the thickness of the pedestal. That is, when the through hole is relatively flat in axial direction, distortion of the diaphragm caused by the hardened gel material is prevented.

In another aspect of the present invention, the through hole in the pedestal of the sensor chip has a diameter smaller than a diameter of a concave portion on the reverse side of the sensor chip. In this manner, the sensor chip is attached to the pedestal in a stable manner because of sufficiency of an area used for attachment of the sensor chip on the pedestal.

In yet another aspect of the present invention, the pedestal of the sensor chip is disposed on a case that has another through hole connected to the through hole of the pedestal with the gel material being filled all through the two through holes, and a diameter of the another through hole on the pedestal side is greater than a diameter of the through hole in the pedestal. In this manner, pressure of measuring object is introduced to the diaphragm portion of the sensor chip, and the sensor chip is protected by the gel material with its stress in a low temperature condition appropriately diverted from being applied to the diaphragm.

In still yet another aspect of the present invention, the another through hole in the case takes a horn shape of which a diameter of the hole widens toward an outside of the case. In this manner, stress from the gel material in the hole is appropriately diverted from the diaphragm because movement of the gel material is guided in an opposite direction to the diaphragm. Further, the gel material can easily capture the pressure of the measuring object on the outside of the case because of the horn shape widened toward the outside of the case even in the low temperature.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Embodiments of the present invention are described with reference to the drawings. Like parts have like numbers in each of the embodiments.

A pressure sensor 100 in the present embodiment is used, for example, to measure a pressure of measuring object such as an exhaust gas in an exhaust pipe of a diesel engine for determining a differential pressure of a DPF (Diesel Particulate Filter), a liquid in a piping or the like.

Figure 1:
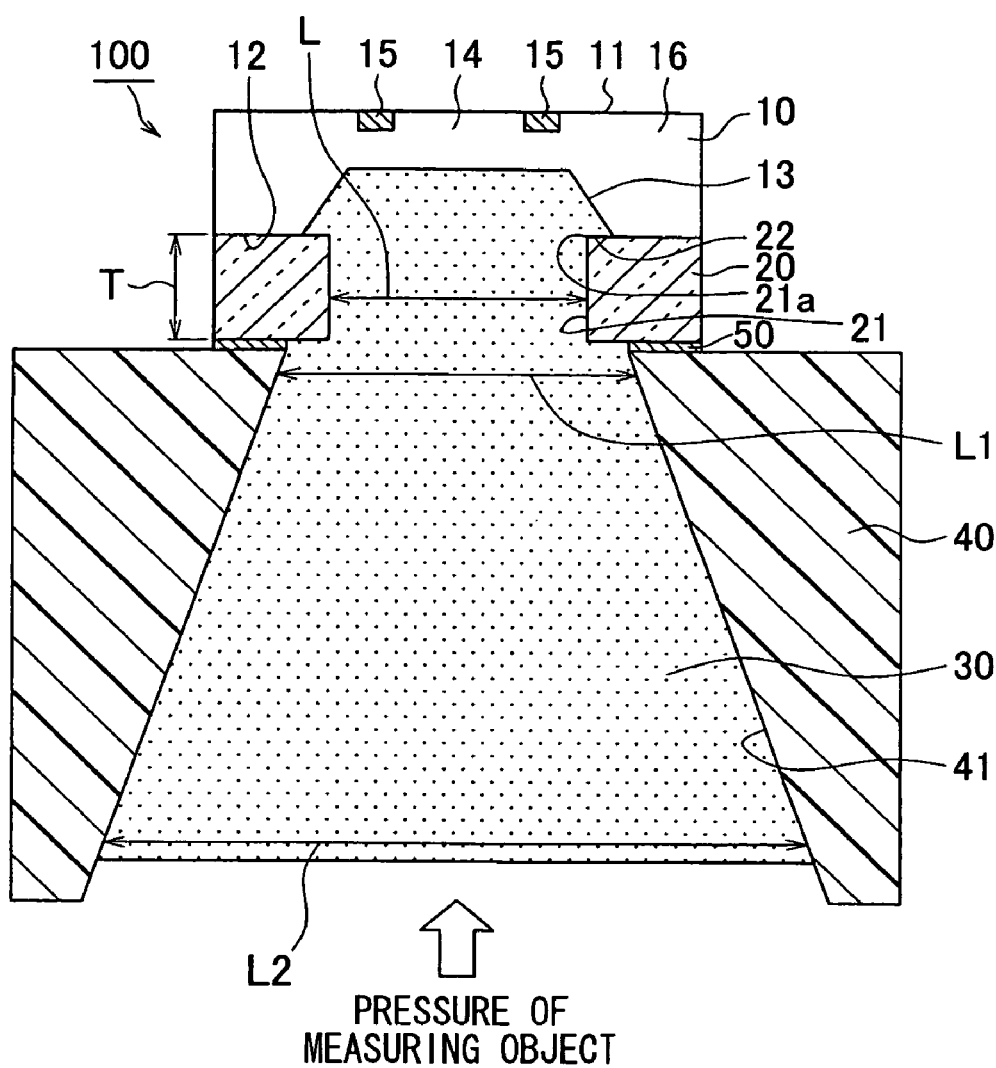
FIG. 1 shows a cross-sectional view of a pressure sensor in an embodiment of the present invention.

FIG. 1 shows a cross-sectional view of the pressure sensor 100 in the present embodiment. The pressure sensor 100 includes a semiconductor diaphragm type sensor chip 10, a pedestal 20 having a through hole 21 for introducing a pressure from an outside and a gel material 30 filled in the through hole 21.

The sensor chip 10 is a semiconductor substrate such as a silicon semiconductor substrate or the like, and has an upper side 11 and a reverse side 12 with a concave portion 13 formed thereon by using a chemical etching method or the like. A thin portion on the upper side 11 of the sensor chip 10 is formed as a diaphragm 14.

Figure 2:
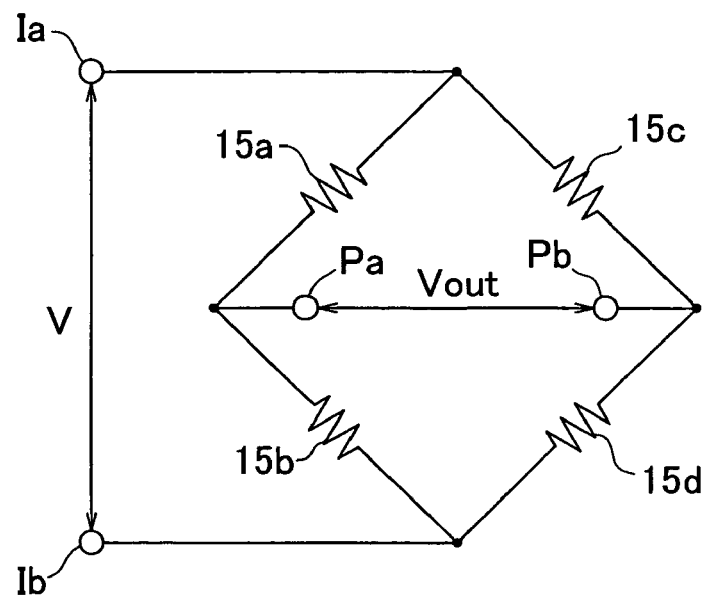
FIG. 2 shows a schematic diagram of a bridge circuit formed on the pressure sensor in the embodiment.

The diaphragm 14 on the upper side 11 of the sensor chip 10 has a piezo-resistor 15 formed as a diffused resistor or the like. The piezo-resistors 15 on the upper side 11 of the sensor chip 10 form a bridge circuit as shown in FIG. 2. That is, the sensor chip 10 of the present embodiment uses piezo-resistors 15 to serve as a semiconductor diaphragm type sensor chip.

The sensor chip 10 outputs a signal that is proportional to a pressure applied to the chip 10 based on the piezoresistance effect (piezoresistivity).

More practically, the sensor chip 10 outputs the signal based on distortion of the diaphragm 14 that receives the pressure, and the distortion of the diaphragm 14 is converted to the signal being proportionally leveled to the pressure by the bridge circuit formed on the diaphragm 14.

The sensor chip 10 is fixed on the pedestal 20 at a thick portion 16 that surrounds the diaphragm 14 on the reverse side 12. The pedestal 20 of the sensor chip 10 is made of glass, and the pedestal 20 is attached to the sensor chip 10 by an anodic bonding.

The through hole 21 of the pedestal 20 connects a sensor chip side of the pedestal 20 with another side. The through hole 21 of the pedestal 20 generally is a straight shape hole having a circular cross section.

The sensor chip 10 has the through hole 21 of the pedestal 20 opposed to the diaphragm 14 from the reverse side 12. That is, the through hole 21 of the pedestal 20 introduces pressure from an outside of the sensor chip 10 to the diaphragm 14 in the concave portion 13 of the sensor chip 10.

As a result, the through hole 21 having a diameter L and the pedestal 20 having a thickness T is in a ratio of between 1 and 3. That is, the relationship between L and T is expressed by an inequality 1<L/T<3.

Further, an opening 21a of the through hole 21 on a sensor chip side is larger than an opening of the concave portion 13. That is, a diameter of the opening 21a is greater than a diameter of the concave portion 13. In this manner, a shoulder portion 22 of the pedestal 20 protrudes from an edge of the opening the concave portion 13 of the sensor chip 10 as shown in FIG. 1.

The through hole 21 is bored by an ultrasonic cutting method, a sand blast cutting method or the like.

The pedestal 20 is, for example, a plane square board in a corresponding shape to a square shape of the sensor chip 10. The diameter L of the through hole 21 is, for example, in a range of approximately 0.8 mm to 2.1 mm, and the thickness T of the pedestal 20 is, in a range of approximately 0.7 mm to 2.1 mm with a ratio of L/T being within a range of 1 to 3.

The piezo-resistor 15 on the sensor chip 10 is disposed on a portion where the diaphragm 14 distorts in a large amount for an increased sensitivity. That is, the piezo-resistor 15 is disposed at a proximity of the diaphragm 14. Further, the piezo-resistor 15 is positioned in the opening 21a on the sensor chip side of the through hole 21 of the pedestal 20.

The concave portion 13 of the sensor chip 10 and the through hole 21 of the pedestal 20 are filled with the gel material 30. The diaphragm 14 of the sensor chip 10 is sealed and protected by the gel material 30.

The gel material 30 is, for example, gel state material made from a silicone gel, a fluorine gel, a fluorosilicon gel or the like. The gel material 30 is poured into the through hole 21 and partially hardened in the hole 21 for sealing.

The pressure sensor 100, i.e., the reverse side 12 of the diaphragm 14 of the sensor chip 10, is protected from corrosive gases or liquid such as an exhaust from a diesel engine by the gel material 30.

The pressure sensor 100 in the present invention includes a case 40 for installation for an exhaust system of a vehicle. The case 40 has a terminal not shown in the figure for electrical connection with an outer circuit.

The case 40 is, for example, made of resin such as PBT (Polybuthylene Terephthalete), PPS (Polyphenilen Sulfide) or the like. The terminal insert-molded on the case 40 is made of, for example, cupper, 42-alloy (iron-nickel alloy) or the like.

The sensor chip 10 on the pedestal 20 is fixed on the case 40 by an adhesive 50. The adhesive 50 is, for example, a resin type adhesive such as a silicon adhesive, a fluorosilicon adhesive or the like.

The terminal on the case 40 and the sensor chip 10 is electrically coupled by, for example, a bonding wire made of gold, aluminum or the like (not shown in the figure). Therefore, the sensor chip 10 and an outer circuit/part is electrically coupled.

The pedestal 20 is fixed on the case 40 on an opposite side of the sensor chip side. The case 40 has a hole 41 for introducing pressure from an outside of the case 40. The hole 41 and the through hole 21 is connected to each other and is filled with the gel material 30.

The hole 41 on the case 40 is, for example, in a shape of a circular hole. A diameter L1 of the hole 41 on the through hole side is greater than a diameter L of the through hole 21.

Further, the diameter of the hole 41 increases toward an opposite side of the case 40. That is, the hole 41 on the case 40 has a horn shape toward a pressure sensing side.

The pressure sensor 100 having the sensor chip 10 that includes the piezo-resistors 15 and other parts disposed thereon is manufactured by using a well-known semiconductor manufacturing methods such as the CVD (Chemical Vapor Deposition) method, the sputtering method, anisotropic etching and the like.

The pressure sensor 100 detects pressure of the measuring object by introducing the pressure from the hole 41 of the case 40 toward the through hole 21 of the pedestal 20 with mediation by the gel material 30 that seals the reverse side 12 of the sensor chip 10, i.e., the reverse side 12 of the diaphragm 14. The sensor chip 10 outputs the signal of which value is proportional to the pressure applied thereto based on the piezoresistance effect. The signal is outputted from a terminal (not shown in the figure) connected to the chip 10 by wire bonding.

The pressure sensor 100 structured in an above-described manner is used to detect, for example, a differential pressure in an exhaust system of a diesel engine. That is, a pressure can be applied to the sensor 100 from both of the sensor chip side (the upper side 11) and the reverse side 12 to distort the thin portion (the diaphragm 14) of the sensor 100. The distortion of the thin portion is converted to a pressure signal output by the piezo-resistor 15 formed on the chip 10 through the terminal toward an outside circuit or the like.

FIG. 2 shows a schematic diagram of a bridge circuit formed on the pressure sensor 100 in the present embodiment. As shown in FIG. 2, the piezo-resistors 15a, 15b, 15c, 15d are used to form the Wheatstone bridge circuit for pressure detection. That is, applied pressure to the sensor chip 10 is detected as an output voltage Vout between terminals Pa and Pb in consequence of the piezoresistance effect of the resistors 15a, 15b, 15c, 15d distorted under pressure applied thereto when an input voltage V of a direct current is applied between terminals Ia and Ib. The applied pressure is converted to the output signal in proportion.

The pressure sensor 100 in the present embodiment is used to detect a pressure in an extreme condition. That is, temperature of the environment changes in a wide range such as a range between 0 degree to 100 degrees in Celsius or the like.

The pressure sensor 100 for use in the extreme condition is structured in a following manner for appropriately removing (preventing/suppressing) environmental effect even in temperature of approximately –30 degrees in Celsius. That is, a ratio of the through hole 21 of the diameter L in the pedestal 20 to the thickness T of the pedestal 20 is between 1 and 3.

Figure 3:
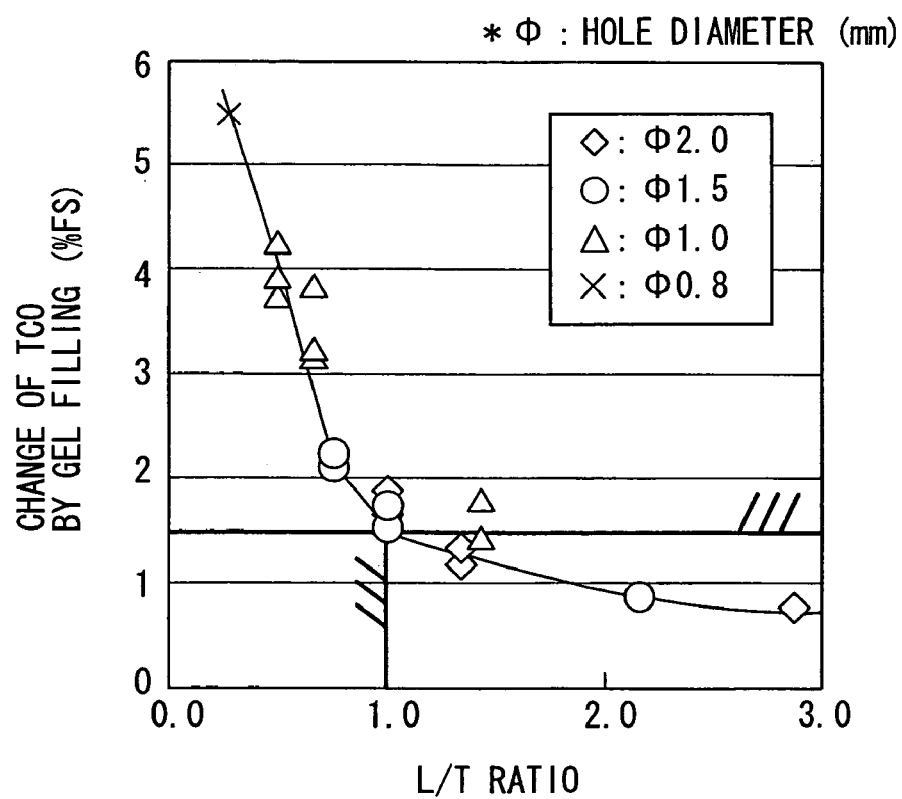
FIG. 3 shows a diagram of a relationship between a ratio L/T and a sensor characteristic variation.

FIG. 3 shows a diagram of a relationship between a ratio L/T and a sensor characteristic variation derived from experiments. As shown in FIG. 3, a curve of the relationship of temperature characteristics of offset voltage (TCO) change (% FS [full scale]) before and after gel filling process against the ratio L/T goes under a threshold of approximately 1.5% FS based on samples having the diameter L of the through hole 21 varied from 0.8 to 2.0 (mm). In this case, the TCO change before and after the filling process indicates a difference of sensor characteristic measured in –30 degrees in Celsius before and after gel filling. More practically, values of the TCO change is determined in the following manner. That is, for example, the sensor characteristic before gel filling is measured both in room temperature and –30 degrees as the output voltage Vout of the sensor chip 10. The output voltage Vout is also measured after gel filling both in room temperature and –30 degrees. When a difference of the Vout value in room temperature and –30 degrees before gel filling is a %, and a difference of Vout value after gel filling is (a+b) %, the value of b % corresponds to a curve of TCO change by gel filling in the diagram shown in FIG. 3.

The range of the ratio L/T is determined based on the following consideration. That is, the TCO change is generally above 1.5% FS when the ratio L/T is under the value of 1. The ratio LIT stays under 1.5% FS when the ratio L/T is between the value of 1 and 3. Therefore, the value of the ratio L/T is chosen to be approximately between 1 and 3 for practical restriction.

In other words, the pedestal 20 having the through hole 21 with the diameter of L and the thickness T in the ratio L/T under the value of 1 does not appropriately serve as a medium for relieving stress from the gel material 30 because of a narrow shape of the through hole 21 in practical use. Further, the thickness T of the pedestal 20 has to be greater than the value of 0.7 (mm) in terms of stability of the pedestal 20 as well as warpage of the sensor chip 10 in a bonding process, and the diameter L of the through hole 21 has to be smaller than the value of 2.1 (mm) in terms of bonding area to the sensor chip 10 and mechanical strength of the pedestal 20. That is, the value of 3 as an upper end of a range of the ratio L/T is substantially determined as the ratio of a maximum value 2.1 of the diameter L of the through hole 21 divided by a minimum value 0.7 of the thickness T of the pedestal 20.

Figure 4:
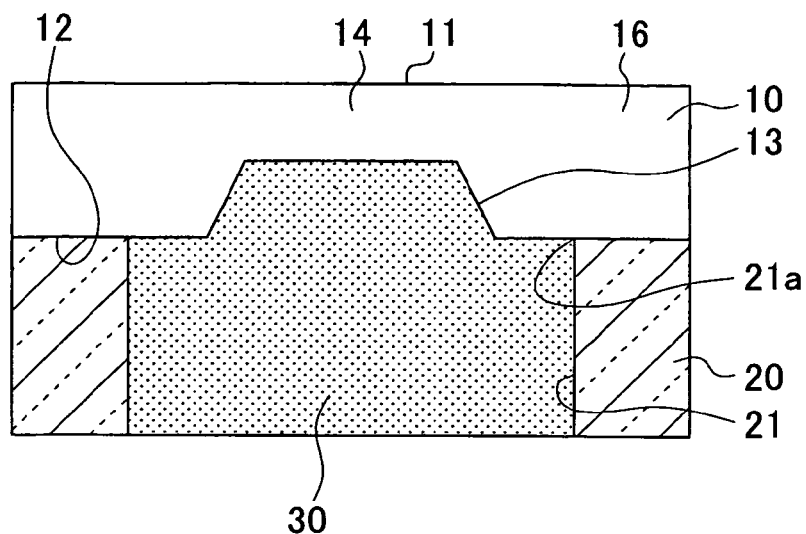
FIG. 4 shows a cross-sectional view of a first modification of the embodiment.

Furthermore, the sensor chip 10 disposed on an opposite side of the concave portion 13 having a greater diameter than that of the through hole 21 on the sensor chip side in the pedestal 20 is beneficial in terms of relieving stress from the gel material 30. That is, in this manner, the thick portion 16 of the sensor chip 10 around the concave portion 13 is entirely attached to the pedestal 20 for achieving a sufficient bonding strength and mechanical strength of combined structure of the sensor chip 10 and the pedestal 20. In addition, the sensor chip 10 may have the concave portion 13 with its diameter smaller than the diameter of the opening 21a of the trough hole 21 on the chip side when the bonding/mechanical strength is secured in other ways as shown in FIG. 4.

Furthermore, the hole 41 on the case 40 has the greater diameter than that of the through hole 21 (L1>L in FIG. 1). In this manner, expanded volume of the gel material 30 in the through hole 21 and the hole 41 hardened in a low temperature is guided toward a pressure sensing side of the hole 41 (i.e., an opposite direction relative to the sensor chip side). This structure is beneficial in terms of relieving stress from the gel material 30 in the low temperature on the reverse side 12 of the sensor chip 10.

Furthermore, the hole 41 has a greater diameter on the pressure sensing side (L2>L1 in FIG. 1). In this manner, the hole 41 is easily bored in the case 40 and is structurally beneficial for relieving stress from the gel material 30 because of an increased amount/area of the gel material 30 filled in the hole 41 as protection from water or the like.

Figure 5:
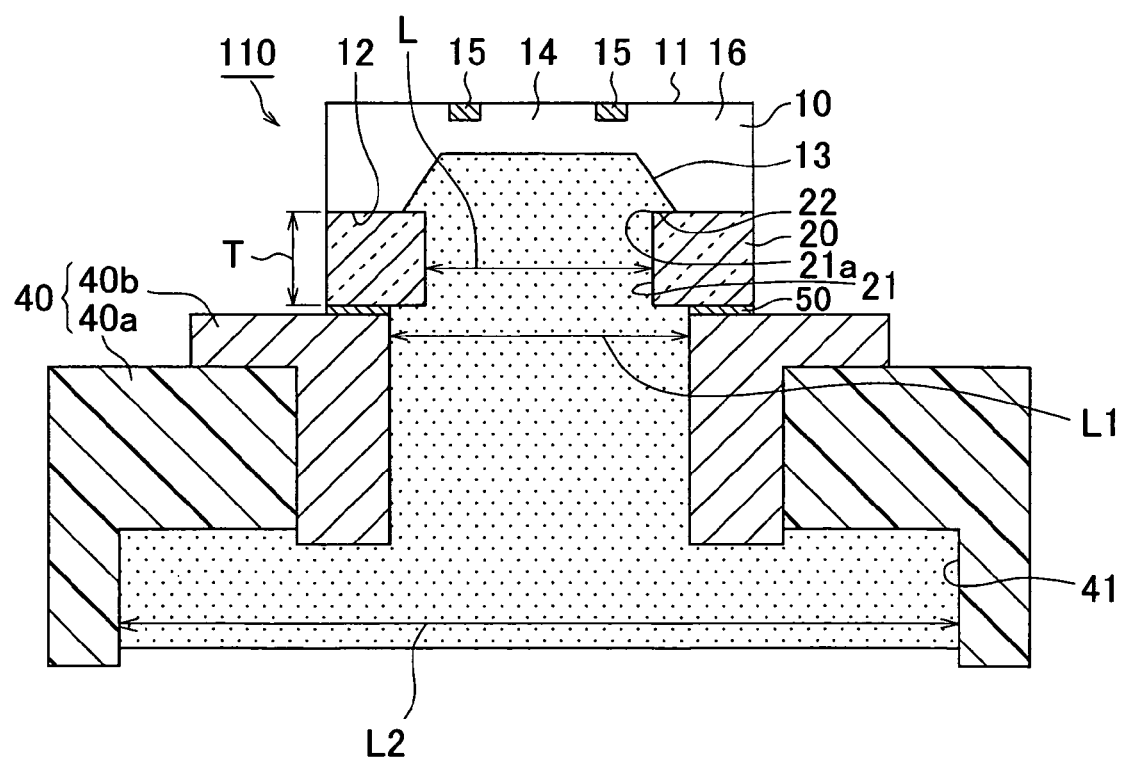
FIG. 5 shows a cross-sectional view of a second modification of the embodiment.

FIG. 5 shows a cross-sectional view of a second modification of the pressure sensor 100 in the present embodiment. In this case, a side wall of the hole 41 has a stepping shape instead of a tapered shape. This structure is also beneficial in terms of relieving stress from the gel material 30 in the low temperature.

Further, a pipe 40b may be installed in the hole 41 of the case 40 that is made of resin. That is, a part of the hole 41 is covered by the pipe 40b in the case 40a as shown in FIG. 5. The pipe 40b may be made of, for example, ceramic material such as mullite, allumina or the like, or metal such as 42 alloy or the like. The pipe 40b is fixed in the hole 41 by, for example, insert-molding or press-fitting. The pipe

40*b* fixed on the through hole side of the hole 41. An inner diameter of pipe 40*b* is represented as the diameter L1 in FIG. 5.

Furthermore, the position of the piezo-resistor 15 within a projection area of the opening 21*a* of the through hole 21 in the glass pedestal 20 on the reverse side 12 of the sensor chip 10 is beneficial in terms of relieving stress from the gel material 30 in the low temperature, because the stress of the gel material 30 within the projection area may be relieved toward the pressure sensing side more easily than the stress of the gel material 30 contained in between the shoulder portion 22 of the pedestal 20 and the side wall of the concave portion 13.

Although the present invention has been fully described in connection with the preferred embodiment thereof with reference to the accompanying drawings, it is to be noted that various changes and modifications will become apparent to those skilled in the art.

For example, the pedestal 20 may be made of a material different from the glass. That is, the pedestal 20 may be made of silicon, ceramic, metal (e.g., 42 alloy) or the like. In other words, a material having a similar linear coefficient of expansion to the silicon of the sensor chip 10 may be used to form the pedestal 20 as long as the material is tolerant in an environment that is under the influence of the exhaust or the like.

Further, the gel material 30 may be made of a material different from the material described above as long as the material is capable for protecting the sensor chip 10 and for transferring the pressure of the measuring object.

Furthermore, the hole 41 in the case 40 may take a different shape from the shape described above. That is, the hole 41 may have a curved side wall instead of a tapered shape side wall, or may have a straight side wall.

Furthermore, the pressure sensor 100 may be directly disposed by using the pedestal 20 only on a subject system, e.g., the exhaust system in a vehicle, instead of being disposed by using the case 40.

Furthermore, the pressure sensor 100 may have protection by using, for example, the gel material 30 or the like on both sides of the sensor chip 10. In this manner, the pressure sensor 100 used for detecting the differential pressure of the DPF (Diesel Particulate Filter) by having the pressure introduced to the both sides of the sensor chip 10 may be effectively protected.

Furthermore, the pressure sensor 100 in the above embodiment may be used to detect an absolute pressure introduced to the reverse side 12 of the diaphragm 14 relative to a vacuum or a reference pressure on the sensor chip 10 side instead of detecting the differential pressure.

Furthermore, the pressure sensor 100 may be used to detect an intake air pressure to an engine, a room pressure of various containers, or a pressure in various spaces.

Such changes and modifications are to be understood as being within the scope of the present invention as defined by the appended claims.

What is claimed is:

1. A pressure sensor for detecting a pressure and for outputting a signal based on the piezoresistance effect of a sensor chip comprising:
    a substrate having the sensor chip on one side and a concave portion on another side, wherein an area of sensor ship disposition on the one side of the substrate corresponds to an area of the concave portion on the another side of the substrate to form a thin portion;
    a piezo-resistor in the sensor chip for outputting a sensor signal that proportionally represents an applied pressure;
    a pedestal being attached to the substrate and having a through hole for introducing the pressure to the sensor chip on the thin portion; and
    a gel material filled in the concave portion and the through hole for protecting the sensor chip,
    wherein the pedestal made of glass is attached to the substrate by anodic bonding, and
    a ratio of a diameter of the through hole to a thickness of the pedestal is substantially within a range of 1 to 3.

2. The pressure sensor as in claim 1,
    wherein a diameter of an opening of the through hole on a sensor chip side is smaller than a diameter of the concave portion.

3. The pressure sensor as in claim 1 further comprising:
    a case disposed on the pedestal having a window for introducing the pressure to the through hole,
    wherein the case is attached to an opposite side of the pedestal relative to the sensor chip,
    a mass of the gel material fills the window and the through hole as an integrated body, and
    a case side diameter of the through hole is smaller than a pedestal side diameter of the window.

4. The pressure sensor as in claim 3,
    wherein the window in a hole shape has a greater diameter on a pressure sensing side than on a pedestal side.

5. The pressure sensor as in claim 4,
    wherein an internal circumference of the window is entirely covered by a covering fixed thereon, and
    the mass of the gel material completely fills up a space in the window with the covering on the internal circumference of the window sealed by the mass of the gel material.

6. A pressure sensor for detecting a pressure and for outputting a signal based on the piezoresistance effect of a sensor chip comprising:
    a substrate having the sensor chip on one side and a concave portion on another side, wherein an area of sensor ship disposition on the one side of the substrate corresponds to an area of the concave portion on the another side of the substrate to form a thin portion;
    a piezo-resistor in the sensor chip for outputting a sensor signal that proportionally represents an applied pressure;
    a pedestal being attached to the substrate and having a through hole for introducing the pressure to the sensor chip on the thin portion; and
    a gel material filled in the concave portion and the through hole for protecting the sensor chip,
    wherein the pedestal is made of ceramic attached to the substrate by covalent bonding, and
    a ratio of a diameter of the through hole to a thickness of the pedestal is substantially within a range of 1 to 3.

7. The pressure sensor as in claim 6,
    wherein a diameter of an opening of the through hole on a sensor chip side is smaller than a diameter of the concave portion.

8. The pressure sensor as in claim 6 further comprising:
    a case disposed on the pedestal having a window for introducing the pressure to the through hole,
    wherein the case is attached to an opposite side of the pedestal relative to the sensor chip,
    a mass of the gel material fills the window and the through hole as an integrated body, and a case side diameter of the through hole is smaller than a pedestal side diameter of the window.

9. The pressure sensor as in claim 8,
wherein the window in a hole shape has a greater diameter on a pressure sensing side than on a pedestal side.

10. The pressure sensor as in claim 9,
wherein an internal circumference of the window is entirely covered by a covering fixed thereon, and the mass of the gel material completely fills up a space in the window with the covering on the internal circumference of the window sealed by the mass of the gel material.

* * * * *